July 17, 1934.    A. F. GARDNER    1,966,979
HYDRAULIC TRANSMISSION MECHANISM
Filed Jan. 4, 1933    2 Sheets-Sheet 1
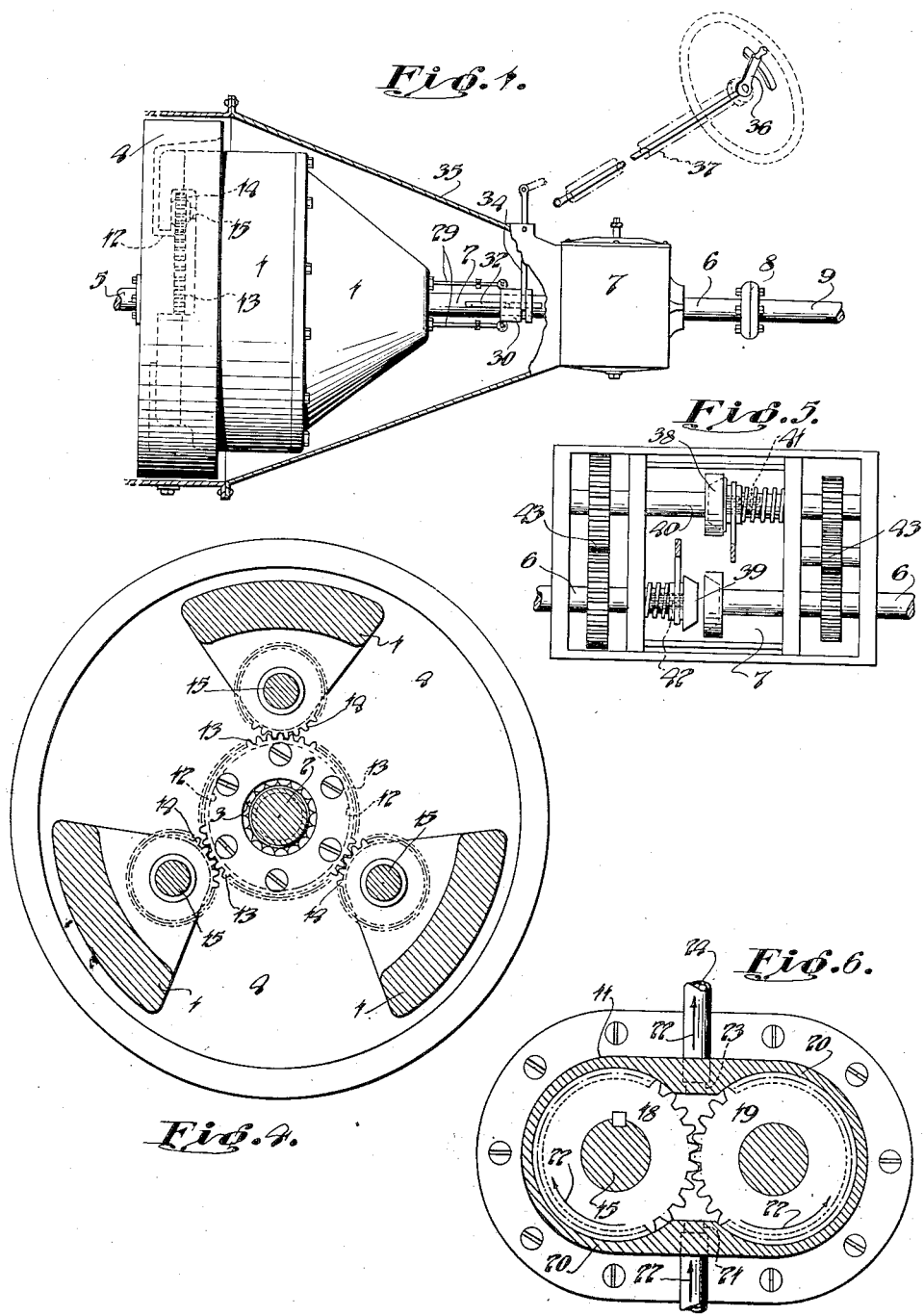

July 17, 1934.    A. F. GARDNER    1,966,979
HYDRAULIC TRANSMISSION MECHANISM
Filed Jan. 4, 1933    2 Sheets-Sheet 2

A. F. Gardner
INVENTOR

By: Marks & Clerk
ATT'ys.

Patented July 17, 1934

1,966,979

UNITED STATES PATENT OFFICE 1,966,979

HYDRAULIC TRANSMISSION MECHANISM

Alexander Frederick Gardner, Werribee, Victoria, Australia

Application January 4, 1933, Serial No. 650,148
In Australia January 7, 1932

2 Claims. (Cl. 74—34)

This invention has reference to improvements in or relating to hydraulic transmission mechanism and has been devised to provide such transmission mechanism as may be incorporated in lieu of the clutch and gear box of a motor car and through which mechanism rotation is transferred from the crank shaft of the engine of the car or the like to the tail shaft but it is to be understood that its use is not confined to same as such mechanism may be employed in various manners.

In one embodiment of the present invention the hydraulic transmission mechanism may comprise a combined variable speed gear, clutch and free-wheeling device having means whereby power is transmitted from a driven shaft to a driving shaft through gearing in such a manner that the speed of the driving shaft may be manually or automatically controlled by the operation of valves controlling the speed of respective spur wheel pumps, one of which spur wheels of each pump is connected through suitable gearing to a common ring gear mounted directly or indirectly to the driven shaft.

An important feature embodied in my invention is the employment of a plurality of spur wheel pumps each pump being enclosed within a suitable housing disposed concentrically within a casting carrying oil and capable of rotation, the housings being so positioned as to provide a balancing effect at all times on the rotation of the casting.

Another important feature embodied in my invention is the means whereby the flow of oil from a reservoir through the spur wheel pumps back to the reservoir is controlled by valves working in unison and manually or automatically operated.

A further important feature embodied in my invention is the variation of the speed of the rotating casting containing the spur wheel pumps that may be obtained in relation to the crank shaft of the engine on the manipulation of a lever controlling the position of the oil valves.

A still further important feature embodied in my invention is the means whereby the casting connected to the longitudinal shaft and carrying the spur wheel pumps may be permitted to freely rotate independently of the rotation of the crank shaft without any of the gearing incorporated in the mechanism being disengaged, thus providing a controlled free-wheeling action manually or automatically controlled by the oil valves.

Now in order that my invention may be more readily understood reference will be made to the accompanying drawings in which—

Figure 1 is an elevation of the mechanism as applied to an automobile.

Figure 4 is a sectional elevation of the mechanism showing the pump driving pinions in mesh with the ring gear mounted to the fly wheel.

Figure 5 is a plan view of the reversing gear box with top cover removed.

Figure 6 is an elevation in section of the interior of the spur wheel pump.

Figure 3:
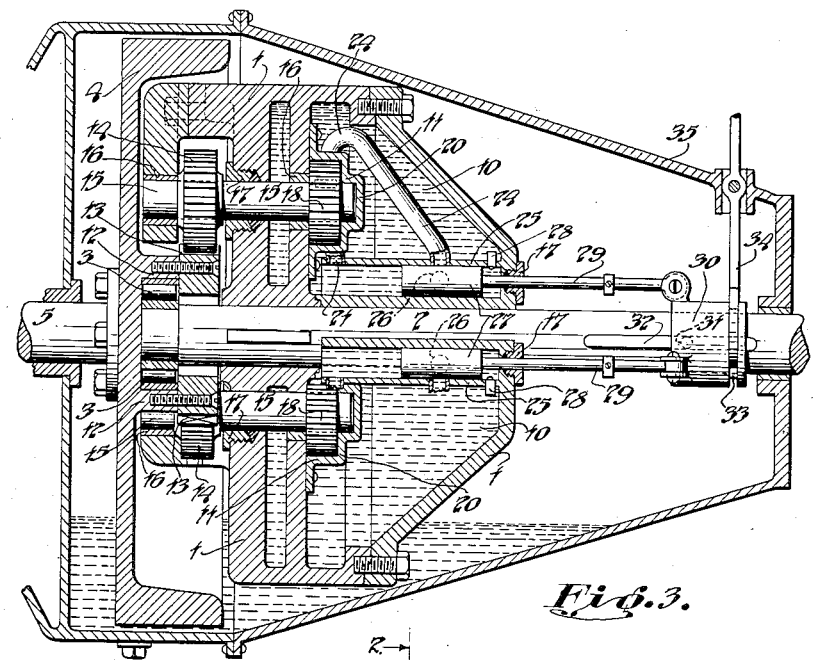
Figure 3 is a sectional elevation of Figure 2 on line 2—2.
Figure 2:
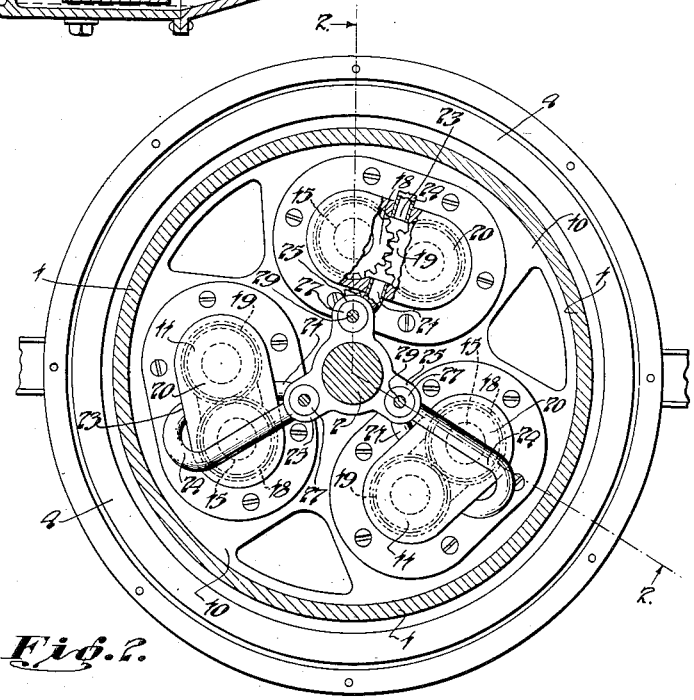
Figure 2 is an end elevation of the mechanism partly in section.

According to one form of carrying my invention into practical effect I provide a metal casting 1 detachably mounted on a centrally disposed longitudinal shaft 2 one end of which is free to rotate within a bearing 3 centrally disposed within a fly wheel 4 or housing (not shown) fixed to the crank shaft 5 of an engine, (not shown) the other end of the longitudinal shaft 2 being attached to the main shaft 6 of a reversing gear box 7, the other end of said main shaft 6 being connected to a universal joint 8 mounted on the tail shaft 9 of an automobile.

The metal casting 1 is preferably constructed in two parts forming a reservoir 10 adapted to contain a quantity of required liquid preferably oil which is employed for use with spur wheel pumps 11 hereinafter described.

The hub 12 of the fly wheel 4 or housing (not shown) carries an external gear 13 having preferably double helical teeth the said gear 13 being in constant mesh with a plurality of pinions 14 the integral shafts 15 of which pinions 14 are free to rotate in bearings 16 provided in the casting 1, suitable glands 17 being employed where necessary to prevent the escape of oil from the oil reservoir 10.

One end of the integral shaft 15 of each pinion 14 has fixed to it in a desired manner, preferably keyed, one wheel 18 of the spur wheel pump 11, the said pump 11 comprising two spur wheels 18 and 19 in constant mesh with one another the one, 19, being an idler, the said wheels 18 and 19 are housed within a close fitting casing 20 mounted to an interior portion of the metal casting 1 in such a manner that the central axis of all the spur wheels 18 and 19 of the pumps 11 are on the path of the same circle concentric with the central axis of the longitudinal shaft 2 to which is mounted the rotatable casting 1, the positions of the pumps 11 being uniformly spaced around the circumference of the circle to retain the casting 1 in correct balance which is necessary and most desirable at all times to ensure efficient functioning of the mechanism.

Each pump casing 20 is provided with a liquid inlet opening 21 so positioned and in communication with the interior of a valve cylinder 25 located near the centre within and at the rear of the reservoir 10 as to permit oil from the reservoir 10 in which the pump 11 is mounted to enter the pump 11 and be carried by the teeth of both rotating spur wheels 18 and 19 in the direction of the arrows 22 as illustrated in Figure 6 of the drawings, to a liquid outlet opening 23 positioned directly opposite the inlet opening 21, the said outlet opening 23 being fitted with a pipe 24 of desired material through which the oil discharged from the spur wheel pump 11 is directed into its respective valve cylinder 25 located within the reservoir 10.

Each valve cylinder 25 is in the form of a casing open at its inner end to permit oil to enter from the reservoir 10. Disposed near the open end of this cylinder 25 is the liquid inlet opening 21 passing from within the valve cylinder 25 to the interior of the pump casing 20.

The wall of the valve cylinder 25 is also provided with one or more escape ports 26 to allow oil to pass back into the reservoir 10 after being pumped from each spur wheel pump 11 through its respective discharge pipe 24 which communicates with the interior of the valve cylinder 25 and in approximate alignment with said ports 26 when a plunger valve 27 slidably disposed within the cylinder 25 is clear of the opening of the discharge pipe 24 the position of which opening in relation to the inlet opening 21 is such that both the discharge opening of the pipe 24 and the inlet opening 21 cannot be closed at the same time by the plunger valve 27.

The normal or neutral position of each plunger valve 27 within its cylinder is between the inlet opening 21 and the opening of the discharge pipe 24 into its respective valve cylinder 25, enabling the casting 1 to be rotated on the withdrawal of the plunger valves 27 sufficient to partly close or close the opening of the discharge pipe 24 which action prevents the oil from discharging from the pump 11, whereas from the neutral position the plunger valves 27 are adapted to be moved forward to close the normal liquid inlet openings 21 of the spur wheel pumps 11, which openings 21 become the liquid discharge openings of the pump during the operation of free wheeling when the crank shaft 5 is rotating at a lower speed than the casting 1 carrying the pumps 11, this result is due to the spur wheels 18 and 19 becoming reversed in direction owing to the speed of the crank shaft 5 being less than the longitudinal shaft 2 or tail shaft 9. When the plunger valve 27 is in this position the free wheeling operation is under control and the engine may be employed as a brake. The wall of the valve cylinder 25 is provided with a nonreturn valve 28 positioned between the before-mentioned escape port 26 and the closed end of the valve cylinder 25. This valve 28 is for the purpose of allowing the discharge of any oil from the valve cylinder 25 between the back of the plunger valve 27 and the closed end of the cylinder 25 on the backward movement of the plunger.

Each plunger 27 is provided with a plunger rod 29 which passes out through the casting 1 of the oil reservoir 10 and is connected to a sleeve 30 slidably mounted on the longitudinal shaft 2 running through the centre of the casing 1, said sleeve 30 being prevented from rotating on the shaft 2 by suitable means preferably a stop 31 integral with said sleeve 30 and in engagement with a feather-way 32 cut in said shaft 2.

As before mentioned each of the plunger valves 27 are connected in a suitable manner to this sleeve 30 which is provided with an annular peripheral groove 33 at one end and carrying a floating forklike lever 34 pivotally mounted to a casing 35 similar to the clutch housing in an ordinary geared automobile which casing 35 completely covers the mechanism and fly wheel 4 and is adapted to retain oil, providing lubrication for the moving parts exteriorly of the oil reservoir 10 of the rotating casing 1 thereby resulting in obtaining more silent running of the mechanism. The top of the fork lever 34 may be suitably connected by a series of levers (not shown) to an operating lever 36 positioned preferably on the steering column 37 of the automobile by which operating lever 36 the plunger valves 27 may be actuated in unison at the will of the operator. If desired the top of the fork lever 34 may be provided with a handle (not shown) on the movement of which all the plunger valves 27 within the oil reservoir 10 are actuated. Suitable glands 17 are provided where necessary to prevent the escape of oil from the oil reservoir 10.

The rear of the casing 35 covering the mechanism has mounted to it the small reversing gear box 7 to which is connected the end of the longitudinal shaft 2 emanating from the casting 1 the other end of the reversing gear box 7 being connected through a universal joint 8 to the tail shaft 9. Suitable means are provided for reversing the direction of rotation of the tail shaft 9, said means preferably comprising coacting clutches 38 and 39 slidably mounted on respective splines 41 and 42 on the lay shaft 40 and main shaft 6 respectively and adapted to be engaged and disengaged when desired and in such a manner that when the clutch 38 on the lay shaft 40 is in engagement with its supplemental portion the co-acting clutch 39 on the main shaft 6 is disengaged from its respective supplemental portion and when in this position the tail shaft 9 is caused through gearing 43 to rotate in an opposite direction to the longitudinal shaft 2. When the clutches 38 and 39 are in the opposite position to that above described, that is the clutch 38 on the lay shaft 40 disengaged from its respective supplemental portion and the clutch 39 on the main shaft 6 engaged with its supplemental portion, the tail shaft 9 is made to rotate directly with and therefore in the same direction as the longitudinal shaft 2.

In describing the operation of the mechanism when employed in lieu of the clutch and gear box of an automobile it is to be presumed that the engine is running all the time.

The first step to be described will be the relative position and functioning of the various component parts of the mechanism when the tail shaft 9 of the automobile is stationary in which case the plunger valves 27 controlling the flow of oil through the spur wheel pumps 11 are positioned so as to be clear of the openings of the discharge pipes 24 in the valve cylinder 25 permitting the discharged oil from the pumps 11 to be returned to the oil reservoir 10 through the escape ports 26 without any resistance. Under these conditions the casting mounted to the centrally disposed longitudinal shaft 2 is stationary for the reason that the gear 13 fixed to the hub 12 of the rotating fly wheel 4 and in mesh with the respective pump driving pinions 14 is causing the spur wheels 18 and 19 of the pumps 11 to rotate within their respective casings 20 and in doing so pump oil from the reservoir 10 through the inlet openings 21 of the pump and out the discharge pipes 24 back into the reservoir 10 through the ports 26 in the plunger valve cylinders 25 since no resistance to the discharge of oil from the outlet pipes 24 prevails.

The result obtained by operating the lever 36 controlling the position of the plunger valves 27 within their respective cylinders 25 so that the end of the plunger 27 partly closes the opening of the discharge pipe 24 is as follows:—

A resistance is set up within each oil discharge pipe 24 owing to the amount of oil being pumped into said pipe 24 not being able to pass through the reduced discharge opening fast enough. Under this condition the speed of the spur wheels 18 and 19 of the pumps 11 is reduced and as one wheel 18 of said spur wheels 18 and 19 of each pump 11 is fixed to the integral shaft 15 of its respective driving pinion 14 which pinion 14 is in constant mesh with the gear 13 mounted to the hub 12 of the rotating fly wheel 4 the said pinion 14 commences to travel around the gear 13 to compensate with its reduced speed around its own axis which action causes the casting 1 fixed to the central longitudinal shaft 2 connected with the tail shaft 9 to rotate as the shaft 15 of the pump driving pinions 14 are housed in bearings 16 mounted to the casting 1.

The more the oil discharge openings are covered by the plunger valves 27 the slower the pump driving pinions 14 rotate around their own axis and the faster they travel around the gear 13.

When the positions of the plunger valves 27 are such that no oil can discharge into the valve cylinders 25 the pump spur wheels 18 and 19 cease to rotate on their axis and similarly the pump driving pinions 14 become stationary in relation to the gear 13 and move as if they were integral with same in which case the longitudinal shaft 2 and the tail shaft 9 rotate in synchronism with the crank shaft 5.

Any type of reversing gear box 7 may be employed to change the direction of travel of the tail shaft 9 but preferably of the type herein described.

I do not wish to be arbitrarily confined to the hereinbefore mentioned details since I may if necessary have to depart therefrom and while I have described the essential characteristics of my invention I desire it to be understood that various suitable improvements and modifications may be embodied in my invention without departing from its spirit and scope.

What I claim is my invention and desire to secure by Letters Patent is:—

1. In a driving mechanism, the combination of axially alined driving and driven shafts, said driving shaft having a concentric gear fixed thereon, with a transmission mechanism comprising a closed main casing adapted to contain oil splined on the driven shaft, a spindle journaled in the wall of the main casing parallel with the axis of the shafts and having fixed on its outer end a pinion meshing with the gear fixed on the driving shaft, a spur wheel pump mounted within the main casing and including a pair of meshing spur wheels with one of said wheels fixed on the inner end of the spindle, and an auxiliary casing mounted in the main casing over the spur wheels, said auxiliary casing having an inlet and outlet on sides of the meshing spur wheels, and a valve mechanism controlling the passage of oil through the auxiliary casing including a cylinder having ports respectively communicating with the interior of the main casing and with the inlet and the outlet of the auxiliary casing, a plunger adjustable in the cylinder to control the communication of said cylinder with the interior of the main cylinder and with the inlet and outlet of the auxiliary casing means for adjusting the plunger in the valve cylinder, the adjustment of the plunger operating to control the flow of oil through the pump and cylinder to vary the drive transmitted from the driving shaft to the driven shaft.

2. In a driving mechanism, as in claim 1 in which the valve cylinder is closed at one end and open at the other end to the interior of the main casing, said cylinder having adjacent to its open end a port communicating with the inlet of the auxiliary casing to the meshing spur wheels, said cylinder having adjacent to its closed end a port communicating with the outlet of the auxiliary casing of the pump and also provided with an escape port adjacent to the last mentioned port, and a rod extending from the outer end of the plunger through the closed end of the cylinder for adjusting the plunger with relation to the ports.

ALEXANDER FREDERICK GARDNER.